Dec. 26, 1961     M. L. SAMUELS ET AL     3,014,266
METHOD FOR MAKING AND REPAIRING ROLLS
Original Filed Sept. 21, 1956
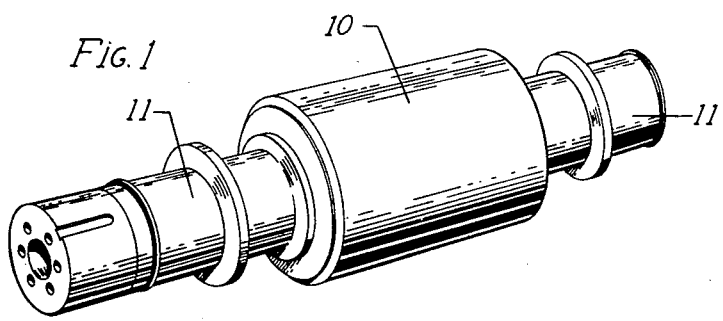
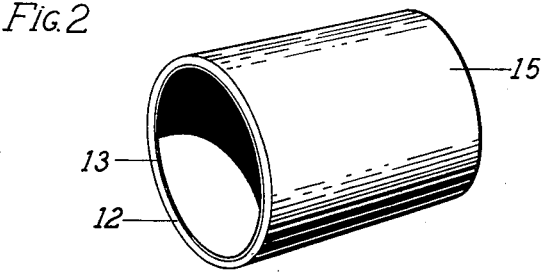
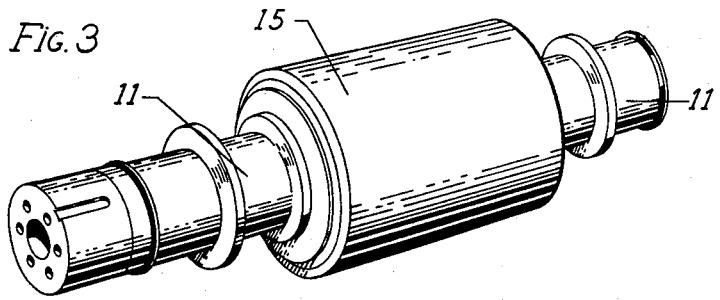
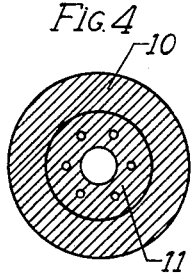 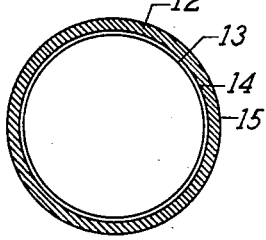 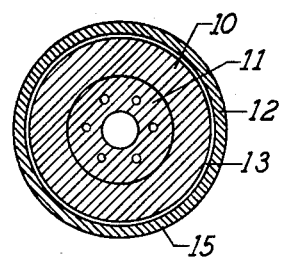
INVENTORS
Martin L. Samuels
John E. Pettit
BY
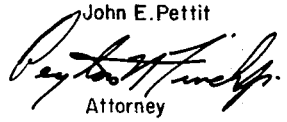
Attorney United States Patent Office 3,014,266
Patented Dec. 26, 1961

3,014,266
METHOD FOR MAKING AND REPAIRING ROLLS
Martin L. Samuels, Mount Holly, and John E. Pettit, Burlington, N.J., assignors to United States Pipe and Foundry Company, Birmingham, Ala., a corporation of New Jersey
Original application Sept. 21, 1956, Ser. No. 611,118, now Patent No. 2,964,251, dated Dec. 13, 1960. Divided and this application Nov. 13, 1958, Ser. No. 773,783
13 Claims. (Cl. 29—148.4)

This invention relates to reconditioning and improving worn or damaged rolls and the manufacture of new rolls of superior quality. More particularly it relates to a method of reconditioning or manufacturing rolls by novel shrink-fitting operations, and to the rolls produced by such method. This application is a division of application Serial No. 611,118, filed September 21, 1956, now Patent No. 2,964,251, and entitled "Roll Structure and Method."

The rolls, or rollers, with which this invention is concerned, are those cylindrically shaped metal rolls used in various industries for grinding, comminuting, crushing or milling a multiplicity of materials such as cereal grains, metals, ceramics, minerals and many others. All these rolls have in common a hard and abrasion resistant outer working surface which serves to contact the material being ground, etc. under sufficient pressure to accomplish the desired result.

The most common rolls in general usage utilize a working surface of chill or white iron. The remainder of the roll structure, however, is usually of a softer but stronger metal, such as gray iron, to withstand the radial forces and the forces required to rotate the roll about its longitudinal axis. The main body of the roll, i.e. other than the working surface, must be of a metal softer than the hard and brittle chill iron in order that the necessary machining operations can be accomplished so as to fit the roll in the desired equipment. For a great number of years such rolls were statically cast in vertically arranged cylindrical metal molds. A charge of molten iron was poured into the mold to form a solid casting, and that part of the metal in contact with and adjacent to the walls of the mold froze quite fast to give the chilled outer working surface. The remainder of the metal solidified much slower and resulted, when properly balanced compositionally, in the gray iron required for the interior of the roll. By this method journals or shafts were cast of gray iron as an integral part of the roll. The principal disadvantage of such statically cast rolls was the uneven depth of the chilled iron working surface. When the chilled iron had worn through at its thinnest point, the entire roll was scrapped.

Greatly improved roll quality, with attendant savings in cost, resulted from the discovery that rolls could be cast centrifugally. By this method a bimetallic cylindrical casting was utilized, also having an outer layer of a hard but brittle metal, e.g. chill iron, and an inner layer of more ductile and softer metal, e.g. gray iron. These bimetallic castings opened up the possibility of metal combinations other than the previously limited chilled and gray irons, since the rate of solidification no longer controlled the formation of the outer working layer. These castings are produced by first pouring a charge of molten metal, of a composition to give the hard surface, into a horizontally rotating cylindrical metal mold. The centrifugal force distributes the molten metal uniformly throughout the mold, thus assuring uniform depth of working surface metal throughout the length of the casting. At the proper moment, usually at the time the inner surface of the first poured metal has just solidified, a charge of a second metal, melted in a different furnace and of a different composition, is poured onto the first layer, and spinning of the mold continued until the second charge has completely solidified. The resulting casting is not a solid body, but, in part due to limitations of the method, a cylindrical void is left at the interior of the casting throughout its length. The required journal or shaft is fitted into this void, after any machining thereon to effect conformity to predetermined size and shape, to complete the roll.

Although the latter centrifugally cast rolls are vastly superior, they are subject to the disadvantage in common with the statically cast rolls of being quite expensive. A major portion of the expense of centrifugally cast rolls results from the machining and installation of shafts or journals. The overall cost of rolls heretofore available is further aggregated by the fact that worn or damaged rolls have no value other than the actual metal content for scrap.

It is accordingly a principal object of this invention to provide a procedure whereby rolls of superior initial quality can be produced and subjected to reuse following wear or damage.

A further object of the invention is the provision of a method whereby worn and damaged rolls may be provided with a replaceable working surface.

Another object of the invention is the provision of a method whereby rolls having improved physical properties as compared to previously available rolls, without the attendant disadvantage thereof, may be made.

More particularly, the object of the invention is to provide a method for making rolls having a permanent core and a replaceable shell.

Other and further objects of the present invention will be apparent from the following description, the accompanying drawings, and the appended claims.

In the drawings,
FIGURE 1 is a perspective view of a grinding roll core suitable for use in accordance with the invention;
FIGURE 2 is a perspective view of a grinding roll core suitable for use in accordance with the invention;
FIGURE 2 is a perspective view of a bimetallic cast shell adapted to be shrink-fitted onto the core;
FIGURE 3 is a perspective view of a completely assembled roll in accordance with the invention, constructed from the core of FIGURE 1 and the shell of FIGURE 2;
FIGURE 4 is an end elevation of FIGURE 1;
FIGURE 5 is an end elevation of FIGURE 2; and
FIGURE 6 is an end elevation of FIGURE 3.

It is of course well known to shrink-fit one tubular member over another so that, in effect, the periphery of the inner member is resurfaced. During the course of investigations leading to the present invention, it was first considered that this well known principle could be utilized to recondition worn rolls or to construct new rolls with replaceable shells. The attempt with this method involved the thought that a shell of a heat hardenable metal could be given a softening anneal, turned, and bored to an inside diameter slightly smaller than its intended core, heated to expand, and placed around the core while hot. This step would combine hardening with shrink-fitting and also provide sufficient space between the cold core and the hot shell to compensate for scaling and distortion resulting from the hardening heat treatment. Attempts with this method, however, were not successful in that a tight fit was not achieved after cooling the shell. Apparently the core expands through absorption of heat from the outer shell, stretches the outer shell, and then contracts away from it when cooling. This difficulty could not be overcome even by water cooling the core, nor by cooling the shell to much lower temperature before placing it around the core.

Shrink-fitting was successfully employed only in accordance with the described and claimed invention. It is essential, in such shrink-fitting operations, that the shell be susceptible to internal machining or boring after the outer working area, i.e. periphery, has achieved final hardness. This is only possible through the provision of an inside lining for the shell, of a separate non-hardenable and easily machinable metal. In accordance with this invention the outer working surface is cast centrifugally as the first layer of a bimetallic cylindrical casting, and the inner layer is cast under such conditions as to result in an integral metallurgical bond between the two layers. The resulting casting is subjected to any desired machining operations, heat treated to harden the outer layer, bored to a predetermined inside diameter slightly less than the outside diameter of the core and then shrink-fitted onto the core so as to become securely attached thereto by radial compression. An important feature is that with the outer layer of the bimetallic sleeve in the hard state, either by virtue of a composition which will be hard as cast or after a hardening heat treatment, the non-hardenable inner layer can be bored without difficulty.

Another advantage resulting from the utilization of a softer inner layer of the shell is its function as a cushion between the hard outer layer and the core. Even if it were possible to accomplish shrink-fitting of a single metal shell on a core, there would be great likelihood of cracking the hard shell during usage if not as a result of the shrinking step. The presence of a cushioning layer of a softer, more ductile metal however serves to decrease the tendency.

According to the practice of the invention, there is first provided a roll core, which may be either a newly cast or forged core containing whatever shafts, journals and other appurtenances as are essential for the intended installation; or the core may be salvaged from a previously used roll, whether of the statically or centrifugally cast type. If the core is salvaged from a previous roll, it need only be ground or machined to remove all of the hard and brittle grinding surface remaining, leaving the core with predetermined dimensions and of true cylindrical shape. The core useful in the practice of this invention may be constructed of any metal conventionally used for the inner or core portion of rolls heretofore available, including without limitation gray cast iron and a broad range of cast or forged steels.

The shell portion of the novel roll, assembled with the core in a manner to be hereinafter described, is prepared by casting centrifugally in a permanent metal mold or a sand mold. In accordance with the preferred procedure the roll shell is cast in a cylindrical metal mold supported substantially horizontally for rotation about its longitudinal axis. Before each casting is made the mold is preferably provided on its inner surface with a thin refractory coating in accordance with the practice described in detail in U.S. Patent No. 2,399,606. A predetermined amount of molten metal, of whatever composition is desired in the outer shell layer, is then poured into the mold, and as the mold spins, centrifugal force causes a uniform distribution of the molten metal about the inner periphery of the mold so that the molten metal will conform on its outer periphery to the pattern of the mold and will on its inner periphery be generally cylindrical.

Depending to a large extent upon the characteristics of the first poured metal, it may be and usually is necessary to guard against oxidation of the inner periphery of the metal during cooling thereof. This can be accomplished by any of several means available to maintain a non-oxidizing atmosphere over the surface of the molten metal. Preferably a suitable flux is added to the inner periphery of the first poured metal, which flux serves to both clean the surface and protect against oxidation. Alternatively, a non-oxidizing gas may be blown into the spinning mold at a rate sufficient to ensure the absence of oxidizing gases.

At the time the inner surface of the first poured metal has solidified but is still at a high temperature, a predetermined amount of the second molten metal, of whatever composition is desired in the inner layer of the shell, is poured into the rotating mold and onto the inner periphery of the first poured metal. The proper time to pour the second metal can further be described as that time at which the temperature on the inner surface of the first poured metal has dropped just below the melting point. Then and only then is the second metal poured.

When the second metal is poured onto the periphery of the first, as described, heat from the second instantly raises the temperature of the periphery of the first above its melting point, thus permitting a fused metallurgical bond between the two metal layers throughout their contiguous surfaces. By the term metallurgical bond is meant a continuity of metal radially throughout the casting, with the two bonded metals joined by a relatively thin alloy resulting from mixture of the two metals during casting.

The bimetallic casting is removed from the mold after complete solidification of the second poured metal, and after cooling is prepared for the next step in the fabrication of the roll. In some instances it may be desired to perform certain machining operations on the outer periphery of the shell. Certain metals which may be used for the outer working layer of the shell in accordance with the invention will emerge from the mold in its final hard condition so that only a minimum of metal removal and smoothing can be effected. White or chill iron is an example of this type on which only grinding can be used to remove excess metal. Other metals suitable for the outer working layer can be given a softening anneal before machining, and after completion of all required work on the outer periphery a hardening heat treatment can be utilized to impart the hardness required for the working surface. Still other metals can be used advantageously for the outer shell layer which are in relatively soft, machinable condition upon removal from the mold, and which are hardened by a heat treatment subsequent to certain of the machining operations.

The inner metal layer of the shell of the invention comprises a metal which is sufficiently ductile and soft to permit machining upon removal from the mold, or following any heat treatment utilized for controlling the hardness of the outer layer. In other words, the inner layer comprises a metal the hardness of which is unaffected by heat treatment. Because of this characteristic, the required machining of the inner periphery of the inner layer, i.e. boring of the inner shell layer, can be effected at any time irrespective of the hardness condition of the outer layer.

The machining of the bore is essential to ensure proper fit of the shell over the core upon completion of the assembly. The bore, i.e. the inside diameter of the inner layer of the bimetallic shell, is machined to a predetermined diameter and in all instances the diameter will be slightly less than the outside diameter of the core. The difference between the diameter of the core and that of the shell bore is to some extent governed by the nature of the different metals used and the intended use of the finished roll. The binding strength of the shell on the core is dependent upon the initial difference in diameters before assembly and the coefficient of expansion of the inner layer of the bimetallic shell. The intended use is an important consideration because rolls for all purposes do not require the same degree of torque resistance.

Following machining of core and shell bore to the above discussed difference in diameters, the bimetallic shell is heated to a predetermined temperature to effect expansion thereof to a bore diameter slightly greater than the diameter of the core. While the shell is so heated and expanded the unheated core is forced into the bore of the shell to fully occupy the bore space. After this assembly the shell is permitted to cool and contract or shrink to tightly bind the shell onto the core.

As will be apparent from the foregoing description the resulting rolls of the invention comprise a solid metallic core member, and a bimetallic shell member shrink-fitted thereon. The bimetallic shell is composed of a relatively ductile metal as the inner layer and a relatively hard metal as the outer layer, the two layers of which are metallurgically bonded by continuous integral fusion throughout the areas of contact.

The particular metals chosen for the outer and inner layers of the bimetallic shell may be varied over a very large range of metal compositions without departing from the concept of this invention. The principal limiting factor for each is the ductility or hardness requirement. In addition, when the metal comprising the outer layer requires heat treatment to control the hardness, the inner layer must be of a metal the ductility of which is not materially affected by the heat treatment. The primary consideration in choosing the metal for the inner shell layer is machinability, since one of the important functions of the inner layer is to permit machining of the bore to exact dimensions. The inner metal layer need only have sufficient strength to withstand the torsion exerted during usage of the roll. In general it is preferred that a metal be used for the inner layer of the shell which has a Brinell hardness number below 300. As examples of suitable metals which have been used, but not by way of limitation, may be mentioned gray iron, Ni-Resist (International Nickel Co.: Ni, 12–30%; Cu, 5–7%; Cr, 1.25–4%; Mn, 1.1–5%; Si, 1–2%; C, 2.75–3.1%), Monel metal, copper, brass, and certain steels. If the outer shell layer is to have a particularly high chromium content, this inner layer should be made of a metal composition with relatively high nickel content to permit chromium absorption by the latter without embrittlement.

The primary factor influencing the choice of a suitable metal for the outer shell layer, which is the working surface of finished rolls, is hardness. In general, it may be said that any metal capable of achieving a Brinell hardness number of 400 or higher is satisfactory for usage. As examples of metals found useful for the outer layer of the roll shell may be mentioned white or chilled cast iron, HC 250 iron (27% Cr; 2.50% C), high-carbon steel, Hadfield steel and some of the Stellites (Haynes Stellite Co., high percent of Co, Cr and W).

The accompanying drawings illustrate a specific example of the invention as applied to the preparation of a cereal flaking roll. FIGURES 1 and 4 illustrate the core, with the main body portion 10 and journals or shafts 11 integral therewith. The particular core employed was a cereal flaking roll with outside diameter worn too small for further use. The entire core, including journals, was constructed of gray iron, although as previously mentioned the core can be of any metal conventionally used for this part of rolls heretofore available. The length of the core, excluding journal, was 24 inches. The periphery of the core was carefully machined to a diameter of 17.319 inches.

The shell illustrated in FIGURES 2 and 5 was cast centrifugally in a permanent metal mold having an inside diameter of 21¼ inches. After coating the mold as described in Patent No. 2,399,606, a charge of molten tool steel (0.44% C; 4.44% Cr; 1.75% Mo; 0.28% V) was added to form, through the action of centrifugal force, a cylindrical uniform layer 12 about 1½ inches thick, with the outside 15 conforming to the mold. A non-oxidizing atmosphere was maintained in the mold during cooling of the molten charge to approximately 2300° F., at which time a charge of molten Ni-Resist metal was added to form a uniform cylindrical layer 13 about ½ inch thick. The two metallic layers were metallurgically bonded together throughout their contiguous surfaces 14 to produce the casting illustrated in FIGURES 2 and 5. The outside diameter of the cast shell was about 20⅞ inches, and the inside diameter about 16⅞ inches.

The shell was then given a softening anneal (1650° F. for four hours then furnace cooled to 1100° F. at 50° F. per hour) following which the outer layer 12 had a Brinell hardness of about 179 and was relatively easily machined to produce a smooth, perfectly rounded periphery.

The shell was then given a hardening heat treatment (1850° F. for three hours, air cooling) whereby the Brinell hardness of the outer layer 12 was increased to about 564. The hardness of the inner layer of Ni-Resist was not affected by either the softening anneal or the hardening heat treatment.

After cooling the shell casing to normal temperatures the inside layer was machined to an inside diameter of 17.310 inches, or 0.009 inch less than the outside diameter of the core.

The shell was next heated to about 500° F. to expand, and slipped over the core as in conventional shrink-fitting. After permitting the assembled roll to cool to normal temperature, the shell was tightly bound to the core. The roll was placed vertically in a Baldwin press and subjected to a pressure differential between core and shell of over five tons with no movement being observed.

While there have been hereinbefore described approved embodiments of this invention, it will be understood that many and various changes and modifications in form, arrangement of parts, details of construction and compositions may be made without departing from the spirit of the invention, and that all such changes and modifications as fall within the scope of the appended claims are contemplated as a part of this invention.

We claim:

1. A method of preparing rolls comprising, providing a cylindrical metal core of predetermined outside diameter and a bimetallic tubular shell of predetermined inside diameter slightly less than said outside diameter of said core, shrink-fitting said shell onto said core to tightly bind said shell to said core by radial compressive force, the said shell comprising an outer layer of hard metal metallurgically bonded to an inner layer of softer metal throughout their contiguous surfaces.

2. A method of preparing rolls comprising, providing a cylindrical metal core of predetermined outside diameter and a bimetallic tubular shell of predetermined inside diameter slightly less than said outside diameter of said core, heating said shell to impart sufficient expansion thereto so that the inside diameter will be greater than the said outside diameter of said core, placing said core in said tubular shell and allowing said shell to cool and shrink on said core to tightly bind said shell on said core by radial compressive force, the said shell comprising an outer layer of hard metal metallurgically bonded to an inner layer of softer metal throughout their contiguous surfaces.

3. A method of preparing rolls comprising, providing a bimetallic tubular casting comprising an outer layer of a heat-hardenable metal and an inner layer of a non-heat-hardenable metal, the two layers being united throughout their contiguous surfaces by a metallurgical bond formed during casting, subjecting said casting to heat treatment to harden said outer layer, boring said inner layer to a predetermined inside diameter, providing a metal core with a predetermined outside diameter greater than said inside diameter of said casting, heating said casting to impart sufficient expansion to its inside diameter so that it will be greater than said outside diameter of said core, placing said core in the bore of said heated casting and allowing said casting to cool and shrink on said core to tightly bind said casting on said core by radial compressive force.

4. A method of preparing rolls comprising, providing a cylindrical metal core of predetermined outside diameter and a cast bimetallic tubular shell of predetermined inside diameter slightly less than said outside diameter of said core, heating said shell to impart sufficient expansion thereto so that the inside diameter will be greater than the said outside diameter of said core, placing said core in said tubular shell and allowing said shell to cool and shrink on said core to tightly bind said shell on said core by radial compressive force, the said shell comprising an outer layer of hard, abrasion-resistant metal having a Brinell hardness value of at least about 400 and an inner layer of a softer, machinable metal having a Brinell hardness value of less than 300, the two said layers being united throughout their contiguous surfaces by a metallurgical bond formed during the casting of said shell by intermixing of the two said metals at said contiguous surfaces.

5. A method as defined in claim 4 in which the metal comprising the outer layer of the cast shell is HC 250 iron.

6. A method as defined in claim 4 in which the metal comprising the outer layer of the cast shell is tool steel.

7. A method as defined in claim 4 in which the metal comprising the outer layer of the cast shell is white cast iron.

8. A method as defined in claim 4 in which the metal comprising the outer layer of the cast shell is Hadfield steel.

9. A method as defined in claim 4 in which the metal comprising the outer layer of the cast shell is a heat hardened ferrous metal.

10. A method as defined in claim 4 in which the metal comprising the inner layer of the cast shell is gray iron.

11. A method as defined in claim 4 in which the metal comprising the inner layer of the cast shell is Ni-Resist iron.

12. A method as defined in claim 4 in which the metal comprising the inner layer of the cast shell is a metal the ductility of which is not materially affected by heat treatment.

13. A method of repairing a worn roll comprising, salvaging a cylindrical metal core of predetermined outside diameter from said worn roll, providing a bimetallic tubular shell comprising an outer layer of hard metal metallurgically bonded to an inner layer of softer metal throughout their contiguous surfaces and having an inside diameter slightly less than the outside diameter of said core, heating said shell to impart sufficient expansion thereto so that the inside diameter will be greater than the outside diameter of said core, placing said core in said tubular shell and allowing said shell to cool and shrink on said core to tightly bind said shell on said core by radial compressive force.

References Cited in the file of this patent

UNITED STATES PATENTS

| | | |
|---|---|---|
| 281,597 | Wilmont | July 17, 1883 |
| 565,243 | Taylor | Aug. 4, 1896 |
| 1,938,995 | Beynon | Dec. 12, 1933 |
| 2,215,424 | Klein | Sept. 17, 1940 |
| 2,812,571 | Strom | Nov. 12, 1957 |